United States Patent
Date

(10) Patent No.: US 8,658,727 B2
(45) Date of Patent: Feb. 25, 2014

(54) ELASTOMER COMPOSITION AND STOPPER FOR MEDICAL CONTAINER

(75) Inventor: Noriaki Date, Aichi (JP)

(73) Assignee: Aronkasei Co., Ltd, Tokyo (JP)

( * ) Notice: Subject to any disclaimer, the term of this patent is extended or adjusted under 35 U.S.C. 154(b) by 0 days.

(21) Appl. No.: 13/643,928

(22) PCT Filed: Mar. 7, 2011

(86) PCT No.: PCT/JP2011/055257
§ 371 (c)(1),
(2), (4) Date: Nov. 2, 2012

(87) PCT Pub. No.: WO2011/135927
PCT Pub. Date: Nov. 3, 2011

(65) Prior Publication Data
US 2013/0231433 A1    Sep. 5, 2013

(30) Foreign Application Priority Data
Apr. 28, 2010  (JP) .................. 2010-103342

(51) Int. Cl.
- C08L 53/00  (2006.01)
- C08K 3/34   (2006.01)
- C08J 7/02   (2006.01)

(52) U.S. Cl.
USPC ............ 524/445; 524/505; 524/451; 524/449

(58) Field of Classification Search
USPC .................... 524/445, 449, 451, 505
See application file for complete search history.

(56) References Cited

U.S. PATENT DOCUMENTS

| 7,193,002 B2 * | 3/2007 | Chen ........................... 524/270 |
| 2003/0101639 A1 | 6/2003 | Schinski |

FOREIGN PATENT DOCUMENTS

| JP | 61-37242 | 2/1986 |
| JP | 07-188508 | 7/1995 |
| JP | 07-228749 | 8/1995 |
| JP | 09-173417 | 7/1997 |
| JP | 2002-143270 | 5/2002 |
| JP | 2007-050138 | 3/2007 |
| JP | 2007-084821 | 4/2007 |
| JP | 2009-530474 | 8/2009 |

OTHER PUBLICATIONS

International Search Report dated May 24, 2011 in connection with PCT International Application No. PCT/JP2011/055258, filed Mar. 7, 2011.
Edited by Edward P. Moore, Jr., translated under the supervision of Tetsuo Yasuda, Mitsuru Sakuma, 'Polypropylene Handbook', Kogyo Chosakai Publishing Co., Ltd., Jul. 20, 2001.
Edited by Edward P. Moore, Jr., translated under the supervision of Tetsuo Yasuda, Mitsuru Sakuma, 'Polypropylene Handbook', Kogyo Chosakai Publishing Co., Ltd., Jul. 20, 2001 (selected pages).

* cited by examiner

*Primary Examiner* — William Cheung
(74) *Attorney, Agent, or Firm* — Cooper & Dunham LLP

(57) ABSTRACT

The object of the present invention is to provide an elastomer composite creating a molded article having excellent heat resistance, anti-leakage and needle retaining properties. To attain the object, the present invention provides an elastomer composite comprising 100 parts by mass of a block copolymer mixture containing 10 to 90 parts by mass of a block copolymer A, and 90 to 10 parts by mass of a block copolymer P, with the total amount of said block copolymers A and P being 100 parts by mass, 100 to 300 parts by mass of a softener B, having a kinetic viscosity in the range of between 50 and 500 centistokes (cSt) at 40° C., 1 to 50 parts by mass of a propylene polymer C, having a modulus in bending in the range of between 1000 and 3000 MPa, and 1 to 50 parts by mass of an aromatic polymer D.

20 Claims, 1 Drawing Sheet

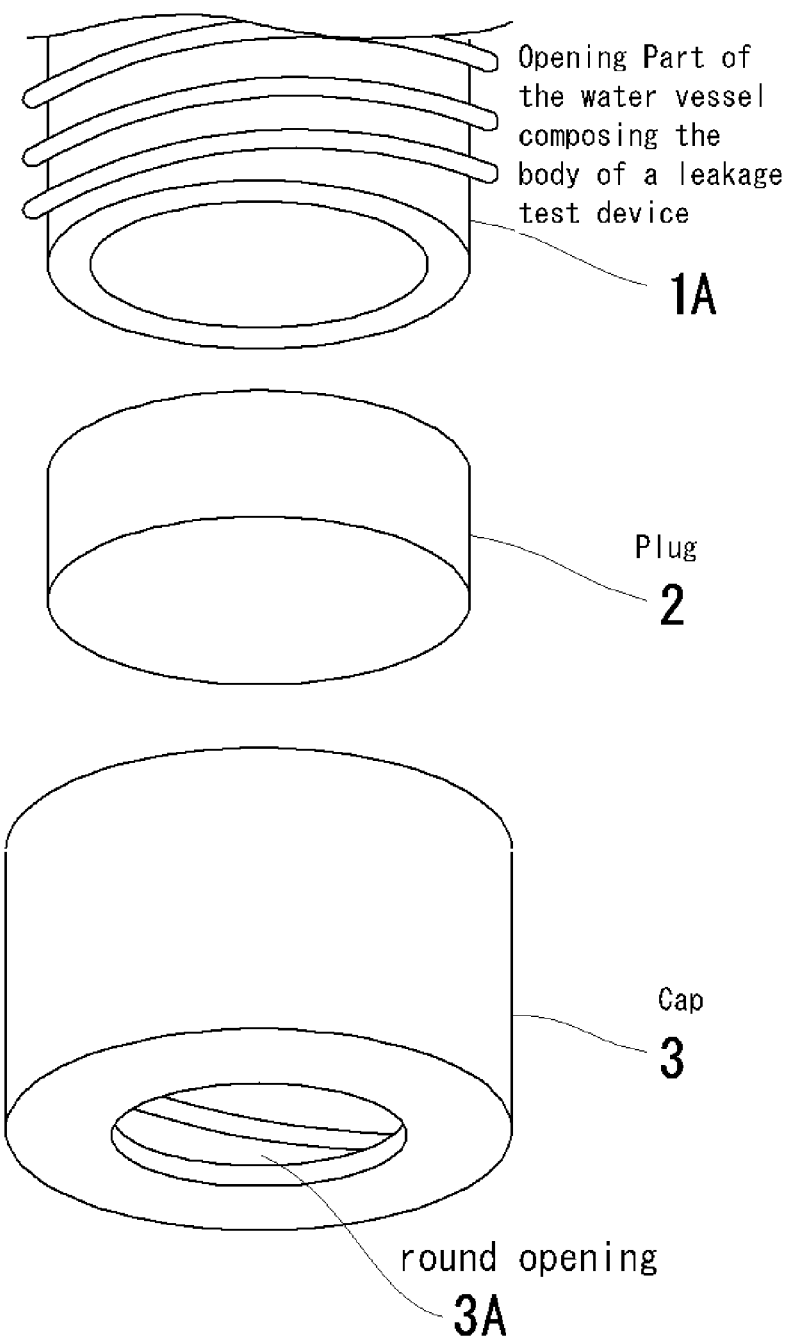

ELASTOMER COMPOSITION AND STOPPER FOR MEDICAL CONTAINER

FIELD OF THE INVENTION

The present invention relates to an elastomer composite as the material for the plug of a medical vessel, such as a bag for infusion fluid. Said elastomer composite contains specific block copolymers, a propylene polymer, softener, and an aromatic polymer in specific ratios. A molded article using said elastomer composite of the present invention has excellent properties as the plug for a medical vessel.

BACKGROUND OF THE INVENTION

Some elastomer composites similar to the elastomer composite of the present invention have been known (Patent Documents 1 to 5). In these Patent Documents, it is disclosed that the molded articles produced by molding said elastomer composites can be used as the material for the plug of a medical vessel.

PATENT DOCUMENTS

Patent Document 1: Tokkai S61-037242
Patent Document 2: Tokkai H07-228749
Patent Document 3: Tokkai H09-173417
Patent Document 4: Tokkai 2002-143270
Patent Document 5: Tokkai 2007-050138

SUMMARY OF THE INVENTION

Problems to be Solved by the Invention

The molded article produced using said elastomer composite as the material disclosed in said Patent Documents cannot satisfy all properties required in a case where said molded article is used as the plug of a medical vessel; said properties may be heat resistance (no deformation through sterilizing with high pressure steam), an anti-leakage property (no leakage and no oozing when the needle is inserted or withdrawn into/from the plug under various conditions), and a needle retaining property (the needle should be hard to come out from the plug when weight is added to the needle), and so the conditions of the usage of said plug made of said molded article must be restricted.

The object of the present invention is to provide an elastomer composite which is useful as the material of a plug having excellent heat resistance, anti-leakage and needle retaining properties.

Means to Solve Said Problems

To solve said problems, the present invention provides an elastomer composite as follows.

To solve said problems, the present invention (Claim 1) provides an elastomer composite comprising: 100 parts by mass of a block copolymer mixture containing 10 to 90 parts by mass of a block copolymer A, and 90 to 10 parts by mass of a block copolymer P, with the total amount of said block copolymer A and said block copolymer P being 100 parts by mass; 100 to 300 parts by mass of a softener B, having a kinetic viscosity in the range of between 50 and 500 centistokes (cSt) at 40° C.; 1 to 50 parts by mass of a propylene polymer C, having a modulus in bending in the range of between 1000 and 3000 MPa; and 1 to 50 parts by mass of an aromatic polymer D;

wherein said block copolymer A is a block copolymer which is a hydrogenated compound of a block copolymer Z1, having one polymer block Y1, being mainly composed of a conjugated diene monomer, and two polymer blocks X1, being mainly composed of an aromatic vinyl monomer, each one at each end of said polymer block Y1, said block copolymer A having a weight average molecular weight in the range of between 150,000 and 500,000, and containing 20 to 50% by mass of an aromatic vinyl monomer unit, and said block copolymer P is a block copolymer which is a hydrogenated compound of a block copolymer Z2, having one copolymer block Y2, being mainly composed of a conjugated diene monomer and an aromatic vinyl monomer, and two polymer blocks X2, being mainly composed of an aromatic vinyl monomer, each one at each end of said copolymer block Y2, said block copolymer P having a weight average molecular weight in the range of between 160,000 to 400,000, and containing 40 to 80% by mass of an aromatic vinyl monomer unit.

As for the elastomer composite in Claim 2, in accordance with said composite of Claim 1, said block copolymer P is preferably a multiblock copolymer.

As for the elastomer composite in Claim 3, in accordance with said composite of Claim 1, said block copolymer P is preferably a distribution controlled block copolymer.

As for the elastomer composite in Claim 4, in accordance with said composite of any of Claims 1-3, said conjugated diene monomer composing said block copolymer A and said block copolymer P is preferably butadiene and/or isoprene.

As for the elastomer composite in Claim 5, in accordance with said composite of any of Claims 1-4, said propylene polymer C is preferably polypropylene.

As for the elastomer composite in Claim 6, in accordance with said composite of any of Claims 1-5, the softening point of said aromatic polymer D is preferably in the range of between 80 and 200° C., said softening point being measured by the method according to ASTM E28.

As for the elastomer composite in Claim 7, in accordance with said composite of any of Claims 1-6, said aromatic polymer D preferably contains a polymer or a copolymer, the main component of which is α-methylstyrene.

As for the elastomer composite in Claims 8, 1 to 100 parts by mass of a filler E is preferably further added to said elastomer composite in accordance with any of Claims 1 to 7.

As for the elastomer composite in Claim 9, in accordance with said composite of Claim 8, said filler E is preferably plate-like or scaly.

As for the elastomer composite in Claim 10 in accordance with said composite of Claim 9, said plate-like or scaly filler E is preferably talc, clay, mica or sericite.

As for the elastomer composite in Claim 11 in accordance with said composite of any of Claims 1 to 10, A hardness of said elastomer composite is preferably in the range of between 30 and 50, said A hardness being measured by the method according to JIS K6253, with a measuring time of 1 second.

Said plug of a medical vessel in Claim 12 of the present invention consists of said elastomer composite in accordance with any of Claims 1 to 11.

Effect of the Invention

Said elastomer composite can be molded by well known molding methods such as injection molding, extrusion molding, press molding, or the like. The molded article produced using said elastomer composite of the present invention has excellent heat resistance, anti-leakage and needle retaining properties, which are important properties required for the plug of a medical vessel.

BRIEF DESCRIPTION OF THE DRAWINGS

FIG. 1 is an illustration of the plastic needle inserting test, mixing injection assuming test, and the weight hanging test.

EMBODIMENT TO PRACTICE THE INVENTION

In the specification, in a case where the range of the numerical value is shown as "the lowest limit numerical value to the upper limit numerical value", the lowest limit numerical value includes the "lowest limit numerical value" and the upper limit numerical value includes the "upper limit numerical value". Molecular weight was measured with a gel permeation chromatograph (GPC) and conversion value as polystyrene. Commonly, the weight average molecular weight is indicated as Mw, and the number average molecular weight is indicated as Mn.

In the first place, block copolymer A, block copolymer P, softener B, propylene polymer C, and aromatic polymer D, which are essential components, and further optional components are described in order.

[Block Copolymer A]

Said block copolymer A is an important component which improves the heat resistance, anti-leakage and needle retaining properties of the molded article produced using said elastomer composite of the present invention.

Said block copolymer A is a hydrogenated block copolymer in which a block copolymer Z1 described as follows, is hydrogenated, and has a weight average molecular weight in the range of between 150,000 and 500,000, and contains 20 to 50% by mass of an aromatic vinyl monomer unit.

Said block copolymer Z1 is substantially a tri-block type copolymer having one polymer block Y1 being mainly composed of a conjugated diene monomer, and two polymer blocks X1 being mainly composed of an aromatic vinyl monomer, each one at each end of said polymer block Y1.

As said aromatic vinyl monomer, which is the main component unit of said polymer block X1, styrene, o-methyl styrene, p-methyl styrene, p-t (tertiary)-butyl styrene, 1.3-dimethyl styrene, α-methyl styrene, vinyl naphthalene, vinyl anthracene, or the like, are illustrated, and two or more kinds of said aromatic vinyl monomers may be used together, and styrene, which is easily obtained, is commonly selected. In a case where two or more kinds of said aromatic vinyl monomers are used, the amount of styrene used in said polymer block X1 is preferably set to be 80% or more by mass, more preferably 90% or more by mass, yet more preferably 95% or more by mass. In a case where the amount of styrene is insufficient, the molded article produced using the resulting elastomer composite will have poor heat resistance.

As a conjugated diene monomer which is main component unit of said polymer block Y1, butadiene, isoprene, chloroprene cyclopentadiene, or the like are illustrated, and two or more kinds of said conjugated diene monomers may be used together, but it is preferable to select butadiene and/or isoprene for their anti-leakage and heat resistance properties.

The ratio of said conjugated diene monomer unit in said polymer block Y1 is set to be 70% or more by mass, preferably 80% or more by mass, yet more preferably 90% or more by mass. In a case where the ratio of said conjugated diene monomer unit is less than 70% by mass, the rubber elasticity of the resulting elastomer composite will become insufficient and the anti-leakage property of the resulting molded article will deteriorate.

In said polymer block Y1, the ratio of 1.2-bond in the main chain of the polymer of said conjugated diene monomer is preferably set to be in the range between 10 and 50%, more preferably in the range of between 15 and 45%, yet more preferably in the range of between 20 and 40%.

In a case where the ratio of the 1,2-bond is insufficient, the compatibility of the resulting elastomer composite with said propylene polymer C will deteriorate, and so the anti-leakage property of the resulting molded article may also deteriorate. On the other hand, in a case where the ratio of 1,2-bond becomes excessive, the rubber elasticity of the resulting elastomer composite will become insufficient, and so the anti-leakage property of the resulting molded article may deteriorate.

In said polymer block X1 and said polymer block Y1, as far as the purpose of the present invention does not deviate, one or more kinds of monomer(s) having an unsaturated double bond which can be copolymerized with said aromatic vinyl monomer, or one or more kinds of monomer(s) having an unsaturated double bond which can be copolymerized with said conjugated diene monomer, may be copolymerized.

Said monomer may be, for instance, aliphatic or cyclic acrylate and/or methacrylate such as methyl acrylate, ethyl acylate, n-propyl acrylate, iso-propyl acrylate, n-butyl acrylate, iso-butyl acrylate t-butyl acrylate, 2-ethyl hexyl acrylate, cyclohexyl acrylate, tetrahydro furfuryl acrylate, methyl methacrylate, ethylmethacrylate, n-propylemethacrylate, iso-propyl methacrylate, n-butyl methacrylate, iso-butylmethacrylate, 2-ethylhexymethacrylate, cyclohexyl methacrylate, tetrahydrofurfuryl methacrylate, stearyl methacrylate, lauryl methacrylate or the like, vinyl ethers such as methyl vinyl ether, ethylunylether, n-propyl vinylehter, n-butyl vinyl ether, iso-butylvinyl ether or the like, nitrile type monomer such as acrylonitrile, methacrylonitrile or the like, fatty acid vinyl such as vinyl acetate, vinyl propionate, or the like, halogen containing monomer such as vinyl chloride, vinylidene chloride, vinylfluoride, vinylidene fluoride or the like, olefins such as ethylene, propylene, or the like, an α-β-unsaturated carboxylic acid such as acrylic acid, methacrylic acid, itaconic acid, maleic acid, crotonic acid, atropic acid, citraconic acid, or the like, a hydroxyl group containing monomer such as 2-hydroxyethyl methacrylate, 2-hydroxyethyl acrylate, 2-hydroxy propyl methacrylate, 2-hydroxy propyl acrylate, allyl alcohol, or the like, amides such as acryl amide, methacryl amide, diacetone acryl amide, or the like, an amino group containing monomer such as dimethyl aminoethyl methacrylate, dimethyl amino ethyl acrylate, dimethyl amino propyl methacrylate, dimethyl amino propyl acrylate, or the like, an epoxy group containing monomer such as glycidyl acrylate, glycidyl methacrylate, glycidyl allyl ether, or the like, a water soluble monomer such as vinyl pyrrolidone, vinyl pyridine, vinyl carbazole, or the like, a hydrolysable silyl group containing monomer such as γ-methacyrloxy propyl trimethoxy silane, vinyl triacetoxy silane, p-trimethoxy silyl styrene, p-triethoxy silylstyrene, p-trimethoxy silyl-α-methyl styrene, p-triethoxy sily-α-methyl styrene, γ-acryloxy propyl trimethoxy silane, vinyl trimethoxy silane, N-β (N-vinyl benzyl amino ethyl-γ-amino propyl) trimethoxy silane hydrochloride or the like.

As aforementioned, said block copolymer Z1 is substantially a tri-block type copolymer, and said polymer blocks, X1 at both ends may be the same or different from each other.

In the present invention, a diblock copolymer, in which one polymer block X1 combines to one end of said polymer block Y1, results in an elastomer composite producing a molded article having poor heat resistance, so that said diblock copolymer can not be used as said block copolymer Z1 of the present invention.

However, even if a copolymer is perfunctorily called as a diblock type copolymer, if said copolymer has substantially the same structure as the tri-block type copolymer of the present invention, said copolymer can be used in the present invention.

For instance, even in the case of the copolymer in which one polymer block X1 and one polymer block Y1' are combined together, if said polymer block Y1' is composed of an aromatic vinyl monomer unit and a conjugated diene monomer unit, and the distribution ratio of each monomer unit over whole domain of said polymer block Y1' is not homogeneous, so that in a case where the domain being adjacent to said polymer block X1 has a large amount of said conjugated diene monomer units, and the domain being apart from said polymer block X1 has a large amount of said aromatic vinyl monomer units, said copolymer is recognized to be included in the same kinds of said block copolymer Z1 described as follows.

This is to say, said polymer block Y1' can be regarded as a diblock type copolymer block consisting of two polymer blocks, one being mainly composed of a conjugated diene monomer unit and the other being mainly composed of an aromatic vinyl monomer unit. Accordingly said block copolymer in which one polymer block Y1' and one polymer block X1 combine together becomes substantially a tri-block type copolymer, and the hydrogenated compound of said block copolymer may be included in said block copolymer A of the present invention. The real substance of the structure of said block copolymer A is providing two domains which are each composed of a large amount of aromatic vinyl monomer units, and one domain composed of a large amount of conjugated diene monomer units, said domain being located between the two said domains.

Said block copolymer Z1 preferably contains said polymer block X1 in an amount of 10 to 60% by mass, more preferably 20 to 50% by mass.

In the case of the block copolymer containing said polymer block X1 in an amount less than 10% by mass, the heat resistance of the molded article produced using the resulting elastomer composite will become insufficient, and in the case of the block copolymer containing said polymer block X1 in an amount of beyond 60% by mass, the elasticity of the resulting elastomer composite will become insufficient, so that it is feared that the molded article produced using said elastomer composite will have a deteriorated anti-leakage property.

Said block copolymer A is a copolymer in which said block copolymer Z1 is hydrogenated by a known method to transfer the unsaturated double bond originating in the conjugated diene monomer, which is the main composite unit of said block copolymer Y1, to the saturated bond. The ratio of hydrogenation is preferably set to be more than 80, but more preferably more than 90%. In a case where said block copolymer Z1 is not hydrogenated, or insufficiently hydrogenated, the heat resistance of the resulting elastomer composite may become insufficient. Said hydrogenation to said block copolymer Z1 should be carried out in the condition that the hydrogenation to said styrene unit is substantially not carried out.

The most common block copolymer in said block copolymer A is a hydrogenated block copolymer of a styrene-butadiene-styrene block copolymer SBS which is a tri-block copolymer consisting of styrene polymer block(S), a butadiene polymer block (B), and styrene polymer block(S). In a case where said SBS is hydrogenated, an ethylene-butylene polymer block (EB) is formed. Said ethylene-butylene polymer block (EB) consists of two ethylene units (E) which is a composite unit "—$CH_2$—$CH_2$—$CH_2$—$CH_2$-" originating from a butadiene unit having a 1,4 bond in said butadiene polymer block (B) (said butadiene unit produced by a 1,4-addition of 1,3-butadiene), and a butylene unit (B) which is a composite unit "—$CH_2$—$CH(C_2H_5)$—" originating from a butadiene unit having a 1,2 bond (said butadiene monomer unit produced by a 1,2-addition of 1,3-butadiene), and the composition of said hydrogenated copolymer of styrene-butadiene-styrene block copolymer SBS is simply referred to as S-EB-S. Accordingly, said hydrogenated copolymer of said SBS is simply referred to as SEBS.

In addition to said SEBS, said block copolymer A includes a styrene-ethylene-propylene-styrene block copolymer (SEPS), which is a hydrogenated copolymer of a tri-block copolymer, composed of styrene polymer block(S), isoprene polymer block (I) and styrene polymer block(S), styrene-ethylene-ethylene-propylene-styrene block copolymer (SEEPS), which is a hydrogenated copolymer of a tri-block copolymer, composed of styrene polymer block(S), butadiene-isoprene copolymer block (BI), and styrene polymer block(S), or the like.

The most preferable elastomer of the present invention for its anti-leakage property or the like, is SEBS. The reason why SEBS is the most preferable elastomer, is that SEBS has a composite component "—$CH_2$—$CH_2$—$CH_2$—$CH_2$—" (E) originating from a butadiene unit having a 1,4 bond, and a composite component "—$CH_2$—$CH(C_2H_5)$—" (B) originating from said butadiene unit having a 1,2 bond between S blocks at both ends, and that said composition of SEBS provides a preferable elasticity to said elastomer composite of the present invention, to play an important role in the anti-leakage property.

Said block polymer A is a polymer containing an aromatic vinyl monomer unit in an amount of between 20 and 50% by mass for all composite monomer units as a basis. Further, said block copolymer A is a polymer containing an aromatic vinyl monomer unit preferably in an amount of between 20 and 45% by mass, more preferably in an amount of between of 20 and 40% by mass. In a case where the ratio of said aromatic vinyl monomer unit in said block copolymer A is below 20% by mass, the heat resistance of the resulting molded article will become insufficient. In a case where the heat resistance of the molded article is insufficient, said molded article may change its shape due to heat treatment such as sterilization. On the other hand, in a case where the ratio of said aromatic vinyl monomer unit in said block copolymer A is beyond 50% by mass, the rubber elasticity of the elastomer composite will become insufficient, and the anti-leakage property of the resulting molded article will be deteriorated.

The weight average molecular weight (Mw) of said block copolymer A is set to be in the range of between 150,000 and 500,000, but preferably between 200,000 and 450,000. In a case where the Mw of said block copolymer A is below 150,000, the resulting molded article will have insufficient heat resistance. In a case where the Mw of said block copolymer A is beyond 500,000, the resulting molded article will have an insufficient anti-leakage property according to the mixing injection assuming test using a metal needle described as later, making the use of said molded article limited.

Two or more kinds of said block copolymer A may be used together.

As aforementioned, the weight average molecular weight (Mw) of said block copolymer of the present invention was obtained by the Gel Permeation Chromatography method (GPC method).

The condition of the measurement of the molecular weight by the GPC method is as follows.
Pump: JASCO PU-980 (made by JASCO Corporation)
Column oven: AO-50 (made by Showa Denko K.K.)
Detector: Detector R1, L-3300 (made by Hitachi, Ltd.), the differential refractometer.
Column: "K-805L (8.0×300 mm)", and "K-804L (8.0×300 mm)" made by Showa Denko K.K. Said two columns are connected together in series.
Column temperature: 40° C.
Guard column: K-G (4.6×10 mm)
Elution solvent: Chloroform
The flow rate of the elution solvent: 1.0 ml/min.
Concentration of the sample: about 1 mg/ml
Filtration of the sample solution: Disposable filter made of polytetrafluoroethylene: Pore size 0.45 µm.
Standard sample to make the calibration curve: polystyrene made by Showa Denko K.K.

Said block copolymer A of the present invention on the market is, for instance, G1651, G1633 (Trade Name, made by Kraton Performance Polymers Inc. SEBS), SEPTON 4055 (Trade Name, made by KURARAY CO., LTD. SEEPS), SEPTON 2006 (Trade Name, made by KURARAY CO., LTD. SEPS).

[Block Copolymer P]

Said block copolymer P is an important component which improves the anti-leakage and needle retaining properties of the resulting molded article produced using said elastomer composite of the present invention.

Said block copolymer P is a hydrogenated block copolymer of the block copolymer Z2 described as follows.

Said block copolymer Z2 has one copolymer block Y2 mainly consisting of a conjugated diene monomer and the aromatic vinyl monomer, and two polymer blocks X2 mainly consisting of the aromatic vinyl monomer unit, wherein each polymer block of both of said polymer blocks X2 combine to each end of said copolymer block Y2.

Said copolymer block Y2, mainly consisting of said conjugated diene monomer and said aromatic vinyl monomer, commonly includes a block type copolymer block consisting of a polymer block YB2, being mainly composed of said conjugated diene monomer, and polymer block YS2, being mainly composed of said aromatic vinyl monomer, and a controlled distribution type copolymer block, having a plural number of domains composed of said conjugated diene monomer and said aromatic vinyl monomer, which are composition monomer units, each domain having a different composition distribution.

Said block type copolymer block Y2 commonly consists of two or more polymer blocks YB2 being mainly composed of a conjugated diene monomer and one or more polymer block(s) YS2 being mainly composed of an aromatic vinyl monomer, with said polymer blocks YB2 being arranged at both ends of said copolymer block Y2. Said block copolymer P, which is a hydrogenated block copolymer of said block copolymer Z2, wherein said block copolymer Z2 has polymer blocks X2 being mainly composed of the aromatic vinyl monomer at both ends of said copolymer block Y2, is referred to as a multiblock copolymer, while said block copolymer A is referred to as a tri-block copolymer.

For instance, in a case where said conjugated diene monomer is butadiene, and said aromatic vinyl monomer is styrene, said block copolymer Z1, which is a tri-block copolymer, will have the following composition [Compound 1].

S-B-S  [Compound 1]

The hydrogenated block copolymer A has the following composition [Compound 2].

S-EB-S  [Compound 2]

The multiblock copolymer Z2 has the following composition [Compound 3], wherein n is an integral number.

S-B-(-S-B-)$_n$-S  [Compound 3]

The hydrogenated block copolymer P has the following composition [Compound 4], wherein n is an integral number.

S-EB-(-S-EB-)$_n$-S  [Compound 4]

In said block copolymer P, indicated as [Compound 4], in the case of n=1, the pentablock type block copolymer indicated as [Compound 5] as follows is illustrated.

S-EB-S-EB-S  [Compound 5]

Said controlled distribution type copolymer block Y2 contains domains at both ends which are each conjugated diene unit rich domains, said domains being respectively adjacent to said polymer blocks X2, and domain(s) which is (are) aromatic vinyl monomer rich domain(s), and not domains at both ends, said domain(s) not being adjacent to said polymer blocks X2, wherein "rich" means the "conjugated diene monomer unit" or the "aromatic vinyl monomer unit" is contained in the domain in an amount of more than the average composition ratio which composes said copolymer block Y2, preferably in an amount of 105% or more of its average composition ratio.

Said block copolymer Z2 having polymer blocks X2 being mainly composed of said aromatic vinyl monomer units at both ends of said controlled distribution type copolymer Y2, or said block copolymer P which is hydrogenated polymer block are referred to as the controlled distribution block copolymers, and said controlled distribution block copolymers are described in detail in Tokkai JP2007-84821 A, and Tokuhyo 2009-542822.

Said polymer block Y2 also includes a random copolymer block of said conjugated diene monomer and said aromatic monomer besides said multiblock type and said controlled distribution type.

In the case of said block copolymer P, said controlled distribution type of said block copolymer P is indicated as S-EB/S-S when said conjugated diene monomer is butadiene and said aromatic monomer is styrene.

In said block copolymer A which is a tri-block copolymer, for instance, in the case of S-EB-S, two segments, one being a styrene polymer block (S segment) and the other an ethylene-butylene polymer block (EB segment), are thermodynamically incompatible, and form a micro phase separation structure, so that high mechanical properties such as rigidity, strength, rubber elasticity, and solidity as well as a high optical property, can be realized. In said structure, the S segments at both ends, having a higher glass transition temperature (Tg), become S domain, which is a physical cross-linking point, and the EB segment, having a lower glass transition temperature, becomes a matrix.

On the other hand, in said block copolymer P which is a multiblock copolymer, or a controlled distribution block copolymer, for instance, S-EB/S-S, the S domain originating in said EB/S is further formed in said tri-block type, so that said block copolymer P has a higher density of the S domain, which is the physical cross link point, improving the rigidity and rubber elasticity.

Said block copolymer P used in the present invention is on the market, for instance, as RP6935 (Trade Name, made by Kraton Performance Polymers Inc. a hydrolyzed copolymer of the controlled distribution block copolymer, S-EB/S-S).

Said block copolymer P contains said aromatic vinyl monomer unit in an amount of between 40 and 80% by mass for all monomers composing said block copolymer P as a basis. Further, the ratio of said aromatic monomer unit is preferably beyond 40% by mass and below 80% by mass, and more preferably beyond 45% by mass and below 80% by mass, yet more preferably beyond 50% by mass and below 80% by mass. In a case where the ratio of said aromatic vinyl monomer unit in said block copolymer P is below 40% by mass, the needle retaining property of the resulting molded article will become insufficient, and the heat resistance of said molded article is also apt to be insufficient. In a case where the ratio of said aromatic vinyl monomer unit is beyond 80% by mass, the rubber elasticity of the resulting elastomer composite will become insufficient and the anti-leakage property of the resulting molded article will also deteriorate.

The Mw of said block copolymer P is set to be in the range of between 160,000 and 400,000, but preferably between 200,000 and 350,000. In a case where the Mw of said block copolymer P is below 160,000, the resulting molded article will have poor heat resistance. In a case where said molded article has poor heat resistance, the resulting molded article may also deform during heat treatment for sterilization.

In a case where the Mw of said block copolymer P is beyond 400,000, the resulting molded article will have an insufficient anti-leakage property according to the mixing injection assuming test using a metal needle described as follows, so that the use of said molded article is limited.

Two or more kinds of said block copolymer P may be used together in the present invention.

In said elastomer composite of the present invention, said block copolymer A and said block copolymer P are used in a ratio in the range of between 10 and 90 parts by mass respectively, assuming that the total of both block copolymers is 100 parts by mass. In a case where the ratio of said block copolymer A is below 10 parts by mass (the ratio of said block copolymer P being beyond 90 parts by mass), the anti-leakage property of the resulting molded article will become insufficient. In a case where the ratio of said block copolymer A is beyond 90 parts by mass (the ratio of said block copolymer P being below 10 parts by mass), the resulting molded article will have an insufficient needle retaining property. The ratio of said block copolymer A and said block copolymer P is preferably set to be in the range of between 20 and 80 parts by mass, but more preferably in the range of between 30 and 70 parts by mass respectively.

[Softener B]

Said softener B is the component which improves the balance between the anti-leakage and needle retaining properties of the resulting molded article, and improves its moldability by giving fluidity to the melted composite through heating.

As said softener B, an oily compound generally added to the common thermoplastic elastomer can be used, mineral oil being illustrated as said softener B. Said mineral oil is such as paraffin type oil, naphthen type oil, aromatic type oil, or the like. Besides said mineral oil, an oligomer, which is a polymer of a vinyl type monomer with a low degree of polymerization, being a fluid at room temperature (20° C.) (olefinic oligomer, diene compound type oligomer, acrylic oligomer, or the like), can be used as the softener B. Said paraffin type oil is preferable as said softener B, since said paraffin type oil has good compatibility with the block copolymers and the propylene polymer used in the present invention.

The kinetic viscosity of said softener B is in the range of between 50 and 500 centistokes (cSt) at 40° C., but preferably between 55 and 300 cSt. In a case where the kinetic viscosity of said softener B is below 50 cSt, the resulting molded article will have an insufficient anti-leakage property, and further, said softener B is apt to ooze out to the surface of the resulting molded article. In a case where the kinetic viscosity of said softener B is beyond 500 cSt, the moldability of the resulting composite is apt to be insufficient, and further, the anti-leakage property of the resulting molded article will also become insufficient. Two or more kinds of said softener B may be used together.

[Propylene Polymer C]

Said propylene polymer C is the component which improves the balance between the anti-leakage and needle retaining properties, and further improves the moldability of the composite of the present invention.

Said propylene polymer C is a polymer containing a propylene monomer unit as the main composite unit, and said propylene polymer C may be a propylene homopolymer, or copolymer in which the radical polymerizable monomer with the exception of propylene is copolymerized with propylene in a ratio so far as the property of the resulting molded article is not spoiled. In the case of said copolymer, the ratio of said propylene monomer unit is preferably set to be 70% or more by mass, more preferably 80% or more by mass, and yet more, preferably 90% or more by mass. The most preferable propylene polymer is substantially a propylene homopolymer. In a case where the ratio of propylene monomer unit in said propylene polymer C is below 70% by mass, the anti-leakage and needle retaining properties of the resulting molded article will become deteriorated. Two or more kinds of said propylene polymers may be used together in the present invention.

As the radically polymerizable monomer besides propylene, olefin with the exception of propylene, such as ethylene or the like, is illustrated.

The deflection temperature under load measured by a method based on JIS KI6921-2 at 0.46 MPa is preferably higher than 80° C., but more preferably higher than 90° C., and yet more preferably higher than 100° C. In a case where the deflection temperature under load of said propylene polymer is too low, the heat resistance of the resulting molded article may become insufficient. The most preferable deflection temperature under load has no upper limit, but commonly the upper limit of the deflection temperature under load of the polymer composed mainly of propylene is about 150° C.

The bending elasticity of said propylene polymer C is set to be in the range of between 1000 and 3000 MPa, but preferably between 1100 and 2500 MPa, and yet more preferably between 1200 and 2000 MPa. In a case where the bending elasticity of said propylene polymer C is below 1000 MPa, the anti-leakage and needle retaining properties of the resulting molded article will become deteriorated. In a case where the bending elasticity of said propylene polymer C is beyond 3000 MPa, the resulting molded article will have deteriorated anti-leakage property.

[Aromatic Polymer D]

Said aromatic polymer D of the present invention is low molecular weight polymer containing an aromatic polymer compound as its composition unit. The Mw of said aromatic polymer D is preferably set to be in the range of between 1,000 and 30,000, but more preferably in the range of between 1200 and 25,000, yet more preferably in the range of between 1,500 and 20,000, though the most preferable range of said Mw is in the range of between 2,000 and 15,000. The Mn of said aromatic polymer D is preferably in the range of between 500 and 15,000, but more preferably in the range of between 700 and 12,000, and yet more preferably between 800 and 10,000, though the most preferable range of Mn is between 1,000 and 8,000.

Said aromatic polymer D can be produced by the polymerization of an aromatic vinyl monomer. Styrene and α-methyl styrene are the most preferable aromatic vinyl monomers for the present invention.

Said aromatic polymer D may also be a polymer produced by the polymerization of the aromatic compound which is a bγ-product of naphta decomposition. In a case where said aromatic polymer D is combined into said elastomer composite of the present invention, the needle retaining property of the resulting molded article will be significantly improved. Further, in a case where said aromatic polymer D is combined into said elastomer composite of the present invention, a styrene-ethylene-propylene-styrene block copolymer (SEPS), a styrene-ethylene-ethylene-propylene-styrene block copolymer (SEEPS), or the like can be used, so that the choice of said block copolymer A becomes wide. In said SEPS and said SEEPS, isoprene is singly used or isoprene and butadiene are used together as said conjugated diene monomer composing Y1.

From the viewpoints of heat resistance, and needle retaining properties, or the like, a polymer composed substantially of a styrene monomer unit and α-methyl styrene unit is preferable as said aromatic polymer D.

The softening point of said aromatic polymer D measured by a method based on ASTM E28 (Ring and Ball softening point) is preferably set to be in the range of between 80 and 200° C., but more preferably in the range of between 90 and 180° C., and yet more preferably in the range of between 100 and 160° C.

The preferable aromatic polymers D on the market are such as Kristalex 5140, Kristalex 3115, Kristalex 3100, Kristlex 3085, Kristalex 3070 (the above described aromatic polymers D are made by Eastman Chemical Co.), Endex 155 (made by Eastman Chemical Co.), or the like. Said aromatic polymers D on the market are each polymers containing α-methyl styrene as their composing monomer unit. Other aromatic polymers D on the market are such as RESIT (registered trademark, made by Sanyo Chemical Industries, Ltd.), ARUFON (registered trademark, made by TOAGOSEI CO., LTD.). Said aromatic polymers D are each polymers being mainly composed of styrene, and have a low molecular weight.

The ratio of α-methylstyrene monomer unit contained in said aromatic polymer D is preferably beyond 10% by mass in a case where said aromatic polymer D is set to be 100% by mass as a basis, but more preferably beyond 20% by mass, and still further more preferably 30% by mass, and yet still more preferably beyond 40% by mass, but the most preferably beyond 50% by mass.

[Elastomer Composite]

Said elastomer composite of the present invention is a composite comprising 100 parts by mass of a block copolymer mixture containing 10 to 90 parts by mass of said block copolymer A, and 90 to 10 parts by mass of said block copolymer P with the total amount of said block copolymer A and block copolymer P being 100 parts by mass, 100 to 300 parts by mass (preferably 120 to 280 parts by mass, more preferably 130 to 260 parts by mass, further more preferably 140 to 250 parts by mass) of said softener B, 1 to 50 parts by mass (preferably 5 to 40 parts by mass, more preferably 10 to 30 parts by mass) of said propylene polymer C, and 1 to 50 parts by mass (preferably 5 to 45 parts by mass, more preferably 10 to 40 parts by mass) of said aromatic polymer D.

In a case where the ratio of said softener B is below 100 parts by mass, the moldability of the resulting elastomer composite will become insufficient, and further, the anti-leakage property of the resulting molded article will also become insufficient. On the other hand, in a case where the ratio of said softener B is beyond 300 parts by mass, the resulting molded article will have deteriorated needle retaining property, and the anti-leakage property of said molded article is also apt to be insufficient.

In a case where the ratio of said propylene polymer C is below 1 part by mass, the moldability of the resulting elastomer composite will become insufficient, while in a case where the ratio of said propylene polymer C is beyond 50 parts by mass, the resulting molded article will have insufficient anti-leakage property.

In a case where the ratio of said aromatic polymer D is below 1 part by mass, the effectiveness of the improvement in the needle retaining property of said elastomer composite will become unremarkable, while in a case where the ratio of said aromatic polymer D is beyond 50 parts by mass, the anti-leakage property of the resulting molded article will become deteriorated.

[Optional Components]

Besides said indispensable components, other optional components may be combined into said elastomer composite of the present invention, so far as the properties of said elastomer composite are not harmed by adding said optional components. As said optional components, a thermoplastic resin besides said block copolymer A, said block copolymer P, said propylene polymer C, and said aromatic polymer D, a filler, lubricant, anti-blocking agent, flame retardant, additives to repress the degeneration and decomposition of the main components of said elastomer composite, represented by such as antioxidant, heat stabilizer, light stabilizer, ultra-violet absorber, or the like, are illustrated.

Particularly useful fillers in said elastomer composite of the present invention are plate-like and scaly fillers.

As said plate-like filler, plate-like talc, plate-like clay, mica, and sericite or the like are illustrated. By adding said plate-like or scaly fillers to said elastomer composite, the needle retaining property of the resulting molded article is much improved.

Further, unplate-like or unscaly fillers, such as calcium carbonate, silica, or the like improve the needle retaining property of said molded article, although the effectiveness of said fillers do not belong in the class as said plate-like or scaly fillers.

The combination ratio of each optional component in a case where said optional component is combined into said elastomer composite can be settled freely so far as the addition of said optional component does not harm the properties of said elastomer composite, and the resulting molded article.

Said thermoplastic resins optionally used are a block copolymer besides said block copolymer A, said block copolymer P, a propylene polymer besides said propylene polymer C, polyethylene, ethylene-vinyl acetate copolymer, ethylene-α-olefin copolymer, acrylic polymer, polyurethane, polyester, polyether, or the like. The combination ratio of said thermoplastic resins that can be optionally used besides said block copolymer A, said block copolymer P, said propylene copolymer C is preferably below 100 parts by mass, but more preferably below 70 parts by mass, yet further more preferably below 40 parts by mass, still further, more preferably below 20 parts by mass, the most preferable ratio being below 10 parts by mass, assuming that the total amount of said block copolymer A and said block copolymer P is 100 parts by mass. In a case where the ratio of said thermoplastic resin is excessive, the resulting molded article may have insufficient heat resistance, anti-leakage property, or needle retaining property.

Said elastomer composite of the present invention is prepared by the known method of blending or kneading said components, each component being combined at a prescribed ratio. For blending, a Henschel mixer, ribbon blender, V-type blender or the like can be used. For kneading, an extruder, mixing roll, kneader, Banbury mixer, and Brabender Plastograph, or the like can be used.

For instance, at first, powdered or pellet shaped solid main raw materials (components A, P, C, and D) are dry-blended by stirring with a mixer, and after which a liquid main raw material (component B) is added to said blended or kneaded raw materials, and mixed by stirring, (component B being impregnated into components A, P, C and D during mixing), and if necessary, other component(s) can be added to the resulting mixture, followed by further stirring and mixing, so as to prepare powder of combined raw materials. The resulting powder of combined raw materials is then pelletized by kneading and extruding with an extruding machine, so as to form pellet type raw material mixture. The aforementioned method is the preferable method for the preparation of said composite.

Alternatively, a method wherein other component(s) is (are) first added to said solid main raw materials (components A, P, C, and D) may be adopted in the present invention.

The use of said elastomer composite of the present invention is described below.

The molding of said elastomer composite of the present invention can be performed using known molding machines such as injection molding, extrusion molding, and press molding machines, or the like.

A molded article produced by molding said elastomer composite of the present invention has excellent heat resistance, an excellent anti-leakage property, and an excellent needle retaining property, which are all important properties required for the plug of a medical vessel. Accordingly said molded article produced by molding said elastomer composite of the present invention can suitably be used as the plug of a medical vessel.

Said composite of the present invention has A-hardness preferably in the range of between 30 and 50, said A-hardness being measured by a method based on JIS K6253 (measuring time, 1 second). Further, said A-hardness of said composite is more preferably in the range of between 30 and 45, but further more preferably in the range of between 30 and 40. In a case where said A-hardness of said composite is below 30, the resulting molded article may have an insufficient needle retaining property. In a case where said A-hardness of said composite is beyond 50, the resulting molded article may have an insufficient anti-leakage property. The measuring conditions of A-hardness in this specification are described as follows.

EXAMPLES

Raw materials

The raw materials used in EXAMPLES are as follows.
1. Block copolymer A, and Comparison block copolymer A'
(a) Block copolymer A1: 1651 (a hydrolyzed block copolymer, SEBS made by Kraton Performance Polymers Inc. Containing ratio of styrene monomer units: 33%, Mw: 290,000, Mn: 260,000, Ratio of 1,2-bond in its butadiene monomer unit: 37%).
(b) Block copolymer A2: G1633 (a hydrolyzed block copolymer, SEBS, made by Kraton Performance Polymers Inc. Containing ratio of styrene monomer units: 30%, Mw: 450,000, Mn: 400,000, Ratio of 1,2-bond in its butadiene monomer unit: 37%).
(c) Block copolymer A3: SEPTON 4055 (a hydrolyzed block copolymer, SEEPS, made by Kuraray Co., Ltd. Containing ratio of styrene monomer units: 30%, Mw: 300,000, Mw: 280,000, Ratio of 1,2-bond in its butadiene monomer unit: about 37%).
(d) Block copolymer A4: SEPTON 2006 (a hydrolyzed block copolymer, SEPS, made by Kuraray Co., Ltd. Containing ratio of styrene monomer units: 35%, Mw: 320,000, Mn: 290,000, Ratio of 1,2-bond in its butadiene monomer unit: about 37%).
(e) Comparison block copolymer A'1: G1650 (a hydrolyzed block copolymer, SEBS made by Kraton Performance Polymers Inc. Containing ratio of styrene monomer units: 29%, Mw 110,000, Mn: 100,000, Ratio of 1,2-bond in its butadiene monomer unit: 37%).
2. Block copolymer P and Comparison block copolymer P'
(a) Block copolymer P1: RP6935 (a hydrolyzed controlled distribution block copolymer S-EB/S-S, made by Kraton Performance Polymers Inc. Containing ratio of styrene monomer units: 58%, Mw: 270,000, Mn: 250,000).
(b) Comparison block copolymer P'1: RP 6936 (a hydrolyzed controlled distribution block copolymer S-EB/S-S, made by Kraton Performance Polymers Inc. Containing ratio of styrene monomer units: 39%, Mw: 150,000, Mn: 140,000).
By the way, at the point when the present application was filed, Kraton Performance Polymers Inc. had changed its product names from RP 6935 to A 1535, and from RP 6935 to A 1536.
3. Softener B and Comparison Softener B'
(a) Softener B1: Kaydol (kinetic viscosity at 40° C.: 64~70 cSt, oil made by Sonneborn Refined Products B.V.)
(b) Comparison Softener B'1: Markhor N172 (kinetic viscosity at 40° C.: 33 cSt, oil made by Exxon Mobil Corporation)
4. Propyrene polymer C and Comparison olefin polymer C'
(a) Propyrene polymer C1: PM600A (bending elasticity: 1600 MPa, MFR (melt flow rate): 75 g/10 min, polypropylene made by Sun Allomer Ltd.)
(b) Comparison olefin polymer C'1: Nipolon Hard 1000 (high density polyethylene HDPE, made by Tosoh Corp., bending strength: 1160 MPa, MFR (melt flow rate): 20 g/10 min, density: 964 kg/m$^3$).
5. Aromatic polymer D
(a) Aromatic polymer D1: Kristalex 5140 (aromatic polymer made by Eastman Chemical Co., softening point: 139° C., Mw: 4900)
(b) Aromatic polymer D2: Kristalex 3100 (aromatic polymer made by Eastman Chemical Co., softening point: 100° C., Mw: 1500)
(c) Aromatic polymer D3: Kristalex 3070 (aromatic polymer made by Eastman Chemical Co., softening point: 70° C., Mw: 950)
(d) Aromatic polymer D4: Eudex 155 (aromatic polymer made by Eastman Chemical Co., softening point: 153° C., Mw: 6950, Mn: 2400)
6. Filler E (optional component)
(a) Filler E1: TALCAN HAYASHI (plate-like talc made by HAYASHI KASEI CO., LTD.)
(b) Filler E2: SUPER 3S (SUPER SSS), calcium carbonate made by MARUO CALCIUM CO., LTD.)

(c) Filler E3: TOKUSIL UR (silica made by Tokuyama Corporation)

(Preparation of Said Composite)

Using the aforementioned raw materials, the composites of the present invention and of the comparisons were prepared. The combination ratio (weight parts) is shown in Tables 1, 2, and 3 (EXAMPLES) and Tables 4 and 5 (COMPARISONS).

The solid raw materials (components with the exception of the softener B and Comparison softener B') were mixed (dry-blended) so as to prepare a solid raw material mixture. Liquid raw materials (softener B or Comparison softener B') were then added and mixed into the resulting solid mixtures so as to impregnate said softener B or B' into each solid raw material mixture, thus preparing raw material mixtures. Each raw material mixture was melted and kneaded by using an extruding machine under the following conditions so as to make pellets of each composition.

(a) Extruding machine: KZW32TW-60MG-NH, made by TECHNOVEL CORPORATION
(b) Cylinder temperature: 180 to 250° C. (the proper temperature was selected to be in the range of between 180 and 250° C.)
(c) Number of revolutions: 300 rpm (Preparation of the Molded Article)

Pellets of each composite were molded by injection molding under the following conditions so as to make a plate-like molded sample, having a length of 125 mm, a width of 125 mm, and a thickness of 2 mm, and a bar-shaped sample having a length of 125 mm, a width of 25 mm, and a thickness of 6 mm. A column shaped sample having a diameter of 20 mm, and a thickness of 6 mm was then made by punching said bar-shaped sample, after which said column shaped sample was used to estimate the properties as a plug.

(a) Injection molding machine: 100MS III-10E (made by Mitsubishi Heavy Industries Ltd.)
(b) Molding temperature: 170° C.
(c) Injection pressure: 30% of the maximum power of the machine (Actual pressure is about 600 kgf/cm$^2$)
(d) Injection time: 10 sec.
(e) Mold temperature: 40° C.

(Evaluations)

Evaluations were carried out on the aforementioned molded article samples regarding the following items.

The results of the evaluations are shown in Tables 1, 2, and 3 (EXAMPLES) and Tables 4, and 5 (COMPARISONS).

(A-Hardness)

Three molded article samples, each having a thickness of 2 mm, were laminated together so as to make a laminated sample with a total thickness of 6 mm. Using said laminated sample, the A-hardness was measured by a method based on JIS K6253, with a measurement time of one second (after one second from the start of the measurement). Said laminated sample was kept for one day in a room where the temperature was kept at 23° C. with its humidity being kept at 50% prior to the measurement. The preferable A-hardness is in the range of between 30 and 50.

(Heat Resistance: Sterilization Test by Heating)

A column shaped molded article sample was kept in an oven at 110° C. for 30 minutes for the sterilization treatment by heating. The presence or absence of any deformation of each sample was visually evaluated.

O: No deformation was observed
Δ: Slight deformation was observed.
X: Deformation was observed.

(Anti-Leakage Test 11: Plastic Needle Inserting Test)

As shown in FIG. 1, the leakage test device consisted of a water vessel (1) having an opening part (1A) on the bottom, said water vessel (1) composing the body of the leakage test device, a male thread being formed on the outside of said opening part (1A). A plug (2) (said column shaped molded article sample) was put into said opening part (1A) of said water vessel (1) composing the body of said leakage test device, so that the lower end surface of said plug (2) was set to be parallel with the horizontal plane. There was also a screw cap (3) having a cylindrical skirt part with a female thread being formed on its inside, and a top onto which a round opening (3A) being formed. Said screw cap (3) was screwed onto said opening part (1A) of said water vessel (1) composing the body of said leakage test equipment, so as to fix said plug (2) between the end of said opening part (1A), and the top having said round opening (3A). Said screw cap (3) was first slowly screwed and from the point that said screwing resistance was notable, further said cap (3) was turned a half turn, so as to fasten said plug (2) tightly. In actuality, said fixing operation of said plug (2) was carried out under the reverse condition that said water vessel (1), composing the body of said leakage test device was set to be upside down, and after carrying out of said fixing operation of said plug (2), said water vessel (1) of said leakage test equipment was then put in a normal condition. Nevertheless, FIG. 1 shows the reverse condition of said water vessel (1) composing the body of said leakage test device, in order to visualize easily (see FIG. 1).

Five hundreds mols of water was poured into said water vessel (1), so as to effect a water pressure of 0.01 MPa onto the plane surface of said plug (2). This evaluation of said leakage test was carried out in a room having had its temperature set at 23° C. and its humidity at 50%.

A medical plastic needle (TC-00503K. made by Terumo Corp.) was then inserted perpendicularly into the center of the lower end surface of said plug (2) and then left as it was for 2 hours. The tubular opening of said needle was sealed so as to obstruct any water leakage. After 2 hours, said needle was pulled out of said plug (2), and the condition of the water leakage from the eye of said needle of said plug (2) after one hour was evaluated by visual observation. Twenty plug samples were used for this evaluation.

O: No oozing and no leakage of water was observed.
Δ: Oozing of water was observed, but no leakage of water was observed.
X: Leakage of water was observed.

Anti-Leakage Test 12: Mixing Injection Assuming Test)

Said plug (2) was put into said opening part (1A) of said water vessel (1) composing the body of said leakage test device, and then said plug (2) was fixed by said screw cap (3), the same as in anti-leakage test 11 (plastic needle inserting test).

Said leakage test device was equipped with said water vessel (1) as its body with an opening (1A) on its bottom, said plug (2) being to be put into said opening (1A). First, said plug (2) (column shaped molded article sample) was put into said opening (1A), after which 500 ml of the water was poured into said water vessel (1), so as to effect the water pressure of 0.01 MPa on the plane surface of said plug (2). This evaluation was carried out in a room having been kept at a temperature of 23° C. and a humidity of 50%.

A metal medical needle (18G, made by Terumo Corp.) attached to an injector was inserted perpendicularly into the center of the lower end surface of said plug (2), after which said needle and said injector were together inclined at an angle of about 30°. After 15 seconds, said needle was pulled out of said plug (2), while maintaining said angle of inclination.

Said operation in which said metal needle was inserted and pulled out into/from said plug (2) was repeated once. The second time, the same injector and the same metal needle as used the first time were used again. The second time, said metal needle was also inserted precisely into the same position on said plug (2) as it was the first time. After second operation to pull out said metal needle form said plug, the condition of the water leakage from the eye of said needle of said plug (2) after one hour was visually evaluated by observation. Twenty plug samples were used for this evaluation.
O: No oozing and no leak of water was observed.
Δ: Oozing of water was observed, but no leakage of water was observed.
X: Leakage of water was observed.
(Needle Retaining Property 10: Weight Hanging Test)

The same water vessel composing the body of said water leakage test device as used in anti-leakage test 11 (plastic needle inserting test) was used, and said plug (2) was set into said opening (1A) of said water vessel (1).

The weight hanging test was carried out without pouring water into said water vessel (1). The evaluation was carried out in a room, its temperature having been kept at 23° C., and its humidity at 50%.

A metal medical needle (TC-00501 K, made by Terumo Corp.) from which the weight (500 g or 600 g) was suspended was inserted perpendicularly into the center of the lower end surface of said plug (2), after which the time from said metal needle insertion to said metal needle coming out (needle retaining time (Sec)) was measured. If said metal needle did not come out in 3600 seconds (one hour), the test was finished. Said test was repeated 10 times and 10 measured values were averaged. In the case of 500 g of weight, the needle retaining time is preferably 500 seconds or more, more preferably 1000 seconds or more, and further more preferably 2000 seconds or more. In the case of 600 g of weight, the needle retaining time is preferably 60 seconds or more, more preferably 80 seconds or more, further more preferably 100 seconds or more.

TABLE 1

|  |  |  |  | EXAMPLE 1 | EXAMPLE 2 | EXAMPLE 3 | EXAMPLE 4 | EXAMPLE 5 |
|---|---|---|---|---|---|---|---|---|
| Materials | Block copolymer A | A1 | G 1651 | 80 | 60 | 43 | | |
| | | A2 | G 1633 | | | | 60 | |
| | | A3 | SEPTON 4055 | | | | | 60 |
| | | A4 | SEPTON 2006 | | | | | |
| | Comparison block copolymer A' | A'1 | G 1650 | | | | | |
| | Block copolymer P | P1 | RP 6935 | 20 | 40 | 60 | 40 | 40 |
| | Comparison block copolymer P' | P'1 | RP 6936 | | | | | |
| | Softener B | B1 | Kaydol | 180 | 180 | 180 | 180 | 180 |
| | Comparison softener B' | B'1 | Markhor N172 | | | | | |
| | Propylene polymer C | C1 | PM 600A | 20 | 20 | 20 | 20 | 20 |
| | Comparison olefin polymer C' | C'1 | Nipolon Hard 1000 | | | | | |
| | Aromatic polymer D | D1 | Kristalex 5140 | 20 | 20 | 20 | | |
| | | D2 | Kristalex 3100 | | | | 20 | 20 |
| | | D3 | Kristalex 3070 | | | | | |
| | Filler E | E1 | TALCAN HAYASHI | | | | | |
| | | E2 | SUPER 3S | | | | | |
| | | E3 | TOKUSIL UR | | | | | |
| Evaluation | A-hardness | | | 35 | 36 | 36 | 37 | 35 |
| | Heat resistance (Sterilization test by heating) | | | ○ | ○ | ○ | ○ | ○ |
| | Anti-leakage test 11 *1 | | ○ | 20 | 20 | 20 | 20 | 20 |
| | (Plastic needle inserting test) | | Δ | 0 | 0 | 0 | 0 | 0 |
| | | | X | 0 | 0 | 0 | 0 | 0 |
| | Anti-leakage test 12 *1 | | ○ | 20 | 20 | 20 | 20 | 20 |
| | (Mixing injection assuming test) | | Δ | 0 | 0 | 0 | 0 | 0 |
| | | | X | 0 | 0 | 0 | 0 | 0 |
| | Needle retaining test 10 *2 | 500 g | | 2543 | 3600 or more | 3600 or more | 615 | 3414 |
| | (Weight hanging test) | 600 g | | 188 | 375 | 2500 | 92 | 256 |

|  |  |  |  | EXAMPLE 6 | EXAMPLE 7 | EXAMPLE 8 | EXAMPLE 9 | EXAMPLE 10 |
|---|---|---|---|---|---|---|---|---|
| Materials | Block copolymer A | A1 | G 1651 | | 60 | 60 | 80 | 60 |
| | | A2 | G 1633 | | | | | |
| | | A3 | SEPTON 4055 | | | | | |
| | | A4 | SEPTON 2006 | 60 | | | | |
| | Comparison block copolymer A' | A'1 | G 1650 | | | | | |
| | Block copolymer P | P1 | RP 6935 | 40 | 40 | 40 | 20 | 40 |
| | Comparison block copolymer P' | P'1 | RP 6936 | | | | | |
| | Softener B | B1 | Kaydol | 180 | 130 | 260 | 180 | 180 |
| | Comparison softener B' | B'1 | Markhor N172 | | | | | |
| | Propylene polymer C | C1 | PM 600A | 20 | 10 | 40 | 20 | 20 |
| | Comparison olefin polymer C' | C'1 | Nipolon Hard 1000 | | | | | |
| | Aromatic polymer D | D1 | Kristalex 5140 | 20 | 10 | 40 | 20 | 20 |
| | | D2 | Kristalex 3100 | | | | | |
| | | D3 | Kristalex 3070 | | | | | |

TABLE 1-continued

|  |  |  |  |  |  |  |  |  |
|---|---|---|---|---|---|---|---|---|
|  | Filler E | E1 | TALCAN HAYASHI |  |  |  | 20 | 20 |
|  |  | E2 | SUPER 3S |  |  |  |  |  |
|  |  | E3 | TOKUSIL UR |  |  |  |  |  |
| Evaluation | A-hardness |  |  | 36 | 37 | 38 | 35 | 35 |
|  | Heat resistance (Sterilization test by heating) |  |  | ○ | ○ | ○ | ○ | ○ |
|  | Anti-leakage test 11 *1 |  | ○ | 20 | 20 | 20 | 20 | 20 |
|  | (Plastic needle inserting test) |  | Δ | 0 | 0 | 0 | 0 | 0 |
|  |  |  | X | 0 | 0 | 0 | 0 | 0 |
|  | Anti-leakage test 12 *2 |  | ○ | 20 | 20 | 20 | 20 | 20 |
|  | (Mixing injection assuming test) |  | Δ | 0 | 0 | 0 | 0 | 0 |
|  |  |  | X | 0 | 0 | 0 | 0 | 0 |
|  | Needle retaining test 10 *2 |  | 500 g | 2608 | 3600 or more | 3020 | 3600 or more | 3600 or more |
|  | (Weight hanging test) |  | 600 g | 120 | 644 | 110 | 1084 | 2248 |

*1 The number of samples coming under each evaluation by the visual observation of ○, Δ, X in 20 samples.
*2 The span of time (seconds) until the needle coming out when two kinds of weights (500 g, 600 g) were loaded.

TABLE 2

|  |  |  |  | EXAMPLE 11 | EXAMPLE 12 | EXAMPLE 13 | EXAMPLE 14 | EXAMPLE 15 | EXAMPLE 16 |
|---|---|---|---|---|---|---|---|---|---|
| Material | Block copolymer A | A1 | G 1651 | 40 | 60 | 60 | 60 |  | 20 |
|  |  | A2 | G 1633 |  |  |  |  | 60 |  |
|  |  | A3 | SEPTON 4055 |  |  |  |  |  |  |
|  |  | A4 | SEPTON 2006 |  |  |  |  |  |  |
|  | Comparison block copolymer A' | A'1 | G 1650 |  |  |  |  |  |  |
|  | Block copolymer P | P1 | RP 6935 | 60 | 40 | 40 | 40 | 40 | 80 |
|  | Comparison block copolymer P' | P'1 | RP 6936 |  |  |  |  |  |  |
|  | Softener B | B1 | Kaydol | 180 | 180 | 260 | 180 | 180 | 180 |
|  | Comparison softener B' | B'1 | Markhor N172 |  |  |  |  |  |  |
|  | Propylene polymer C | C1 | PM 600A | 20 | 20 | 40 | 20 | 20 | 20 |
|  | Comparison olefin polymer C' | C'1 | Nipolon Hard 1000 |  |  |  |  |  |  |
|  | Aromtic polymer D | D1 | Kristalex 5140 | 20 | 20 |  |  |  | 20 |
|  |  | D2 | Kristalex 3100 |  |  | 40 |  |  |  |
|  |  | D3 | Kristalex 3070 |  |  |  | 20 | 40 |  |
|  | Filler E | E1 | TALCAN HAYASHI | 20 | 40 | 80 |  |  |  |
|  |  | E2 | SUPER 3S |  |  |  |  |  |  |
|  |  | E3 | TOKUSIL UR |  |  |  |  |  |  |
| Evaluation | A-hardness |  |  | 36 | 38 | 37 | 35 | 35 | 35 |
|  | Heat resistance (Sterilization test by heating) |  |  | ○ | ○ | ○ | Δ | Δ | ○ |
|  | Anti-leakage test 11 *1 |  | ○ | 20 | 20 | 20 | 20 | 20 | 18 |
|  | (Plastic needle inserting test) |  | Δ | 0 | 0 | 0 | 0 | 0 | 2 |
|  |  |  | X | 0 | 0 | 0 | 0 | 0 | 0 |
|  | Anti-leakage test 12 *1 |  | ○ | 20 | 20 | 20 | 19 | 18 | 17 |
|  | (Mixing injection assuming test) |  | Δ | 0 | 0 | 0 | 1 | 2 | 3 |
|  |  |  | X | 0 | 0 | 0 | 0 | 0 | 0 |
|  | Needle retaining test 10 *2 |  | 500 g | 3600 or more | 3600 or more | 3600 or more | 3021 | 2430 | 3600 or more |
|  | (Weight hanging test) |  | 600 g | 2619 | 3600 or more | 3600 or more | 89 | 66 | 1646 |

|  |  |  |  | EXAMPLE 17 | EXAMPLE 18 | EXAMPLE 19 | EXAMPLE 20 | EXAMPLE 21 |
|---|---|---|---|---|---|---|---|---|
| Material | Block copolymer A | A1 | G 1651 |  | 60 |  | 60 |  |
|  |  | A2 | G 1633 | 20 |  |  |  | 60 |
|  |  | A3 | SEPTON 4055 |  |  | 60 |  |  |
|  |  | A4 | SEPTON 2006 |  |  |  |  |  |
|  | Comparison block copolymer A' | A'1 | G 1650 |  |  |  |  |  |
|  | Block copolymer P | P1 | RP 6935 | 80 | 40 | 40 | 40 | 40 |
|  | Comparison block copolymer P' | P'1 | RP 6936 |  |  |  |  |  |
|  | Softener B | B1 | Kaydol | 180 | 180 | 230 | 180 | 230 |
|  | Comparison softener B' | B'1 | Markhor N172 |  |  |  |  |  |
|  | Propylene polymer C | C1 | PM 600A | 20 | 20 | 30 | 20 | 30 |
|  | Comparison olefin polymer C' | C'1 | Nipolon Hard 1000 |  |  |  |  |  |
|  | Aromtic polymer D | D1 | Kristalex 5140 | 20 | 20 | 40 | 20 | 20 |
|  |  | D2 | Kristalex 3100 |  |  |  |  |  |
|  |  | D3 | Kristalex 3070 |  |  |  |  |  |
|  | Filler E | E1 | TALCAN HAYASHI |  |  |  |  |  |
|  |  | E2 | SUPER 3S |  |  | 20 | 80 |  |
|  |  | E3 | TOKUSIL UR |  |  |  | 20 | 80 |

TABLE 2-continued

| Evaluation | A-hardness | | 36 | 35 | 36 | 36 | 37 |
|---|---|---|---|---|---|---|---|
| | Heat resistance (Sterilization test by heating) | | ○ | ○ | ○ | ○ | ○ |
| | Anti-leakage test 11 *1 | ○ | 17 | 20 | 19 | 20 | 20 |
| | (Plastic needle inserting test) | Δ | 3 | 0 | 1 | 0 | 0 |
| | | X | 0 | 0 | 0 | 0 | 0 |
| | Anti-leakage test 12 *1 | ○ | 18 | 20 | 17 | 20 | 19 |
| | (Mixing injection assuming test) | Δ | 2 | 0 | 3 | 0 | 1 |
| | | X | 0 | 0 | 0 | 0 | 0 |
| | Needle retaining test 10 *2 | 500 g | 3600 or more | 2811 | 3600 or more | 3208 | 3600 or more |
| | (Weight hanging test) | 600 g | 890 | 184 | 644 | 144 | 756 |

*1 The number of samples coming under each evaluation by the visual observation of ○, Δ, X in 20 samples.
*2 The span of time (seconds) until the needle coming out when two kinds of weights (500 g, 600 g) were loaded.

TABLE 3

| | | | EXAMPLE 22 | EXAMPLE 23 | EXAMPLE 24 | EXAMPLE 25 | EXAMPLE 26 |
|---|---|---|---|---|---|---|---|
| Materials | Block copolymer A | A1 G 1651 | 80 | 60 | 60 | 60 | 40 |
| | | A2 G 1633 | | | | 20 | 20 |
| | | A3 SEPTON 4055 | | | | | |
| | | A4 SEPTON 2006 | | | | | |
| | Comparison block copolymer A' | A'1 G 1650 | | | | | |
| | Block copolymer P | P1 RP 6935 | 20 | 40 | 40 | 20 | 40 |
| | Comparison block copolymer P' | P'1 RP 6936 | | | | | |
| | Softener B | B1 Kaydol | 180 | 180 | 260 | 180 | 180 |
| | Comparison softener B' | B'1 Markhor N172 | | | | | |
| | Propylene polymer C | C1 PM 600A | 20 | 20 | 40 | 20 | 20 |
| | Comparison olefin polymer C' | C'1 Nipolon Hard 1000 | | | | | |
| | Aromatic polymer D | D1 Kristakex 5140 | | | | | |
| | | D2 Kristalex 3100 | | | | | |
| | | D3 Kristalex 3070 | | | | | |
| | | D4 Eudex 155 | 20 | 20 | 40 | 20 | 20 |
| | Filler E | E1 TALCAN HAYASHI | | | | | |
| | | E2 SUPER 3S | | | | | |
| | | E3 TOKUSIL UR | | | | | |
| Evaluation | A-hardness | | 35 | 36 | 37 | 35 | 36 |
| | Heat resistance (Sterilization test by heating) | | ○ | ○ | ○ | ○ | ○ |
| | Anti-leakage test 11 *1 | ○ | 20 | 20 | 20 | 20 | 20 |
| | (Plastic needle inserting test) | Δ | 0 | 0 | 0 | 0 | 0 |
| | | X | 0 | 0 | 0 | 0 | 0 |
| | Anti-leakage test 12 *1 | ○ | 20 | 20 | 20 | 20 | 20 |
| | (Mixing injection assuming test) | Δ | 0 | 0 | 0 | 0 | 0 |
| | | X | 0 | 0 | 0 | 0 | 0 |
| | Needle retaining test 10 *2 | 500 g | 2412 | 3600 or more | 2800 | 807 | 1250 |
| | (Weight hanging test) | 600 g | 163 | 271 | 101 | 92 | 112 |

| | | | EXAMPLE 27 | EXAMPLE 28 | EXAMPLE 29 | EXAMPLE 30 |
|---|---|---|---|---|---|---|
| Materials | Block copolymer A | A1 G 1651 | 60 | 60 | 60 | 40 |
| | | A2 G 1633 | | | 20 | 20 |
| | | A3 SEPTON 4055 | | | | |
| | | A4 SEPTON 2006 | | | | |
| | Comparison block copolymer A' | A'1 G 1650 | | | | |
| | Block copolymer P | P1 RP 6935 | 40 | 40 | 40 | 40 |
| | Comparison block copolymer P' | P'1 RP 6936 | | | | |
| | Softener B | B1 Kaydol | 180 | 180 | 180 | 180 |
| | Comparison softener B' | B'1 Markhor N172 | | | | |
| | Propylene polymer C | C1 PM 600A | 20 | 20 | 20 | 20 |
| | Comparison olefin polymer C' | C'1 Nipolon Hard 1000 | | | | |
| | Aromatic polymer D | D1 Kristakex 5140 | | | | 20 |
| | | D2 Kristalex 3100 | | | | |
| | | D3 Kristalex 3070 | | | | |
| | | D4 Eudex 155 | 20 | 20 | 20 | |
| | Filler E | E1 TALCAN HAYASHI | 20 | 40 | 20 | 20 |
| | | E2 SUPER 3S | | | | |
| | | E3 TOKUSIL UR | | | | |
| Evaluation | A-hardness | | 37 | 37 | 38 | 37 |
| | Heat resistance (Sterilization test by heating) | | ○ | ○ | ○ | ○ |
| | Anti-leakage test 11 *1 | ○ | 20 | 20 | 20 | 20 |
| | (Plastic needle inserting test) | Δ | 0 | 0 | 0 | 0 |
| | | X | 0 | 0 | 0 | 0 |

TABLE 3-continued

|  |  |  |  |  |  |  |
|---|---|---|---|---|---|---|
| Anti-leakage test 12 *1 |  | ○ | 20 | 20 | 20 | 20 |
| (Mixing injection assuming test) |  | Δ | 0 | 0 | 0 | 0 |
|  |  | X | 0 | 0 | 0 | 0 |
| Needle retaining test 10 *2 |  | 500 g | 3600 or more | 3600 or more | 3020 | 3600 or more |
| (Weight hanging test) |  | 600 g | 2205 | 3600 or more | 1012 | 1330 |

*1 The number of samples coming under each evaluation by the visual observation of ○, Δ, X in 20 samples.
*2 The span of time (seconds) until the needle coming out when two kinds of weights (500 g, 600 g) were loaded.

TABLE 4

|  |  |  |  | COMPAR-ISON 1 | COMPAR-ISON 2 | COMPAR-ISON 3 | COMPAR-ISON 4 | COMPAR-ISON 5 |
|---|---|---|---|---|---|---|---|---|
| Material | Block copolymer A | A1 | G 1651 |  | 60 | 100 | 95 |  |
|  |  | A2 | G 1633 |  |  |  |  |  |
|  |  | A3 | SEPTON 4055 |  |  |  |  |  |
|  |  | A4 | SEPTON 2006 |  |  |  |  | 95 |
|  | Comparison block copolymer A' | A'1 | G 1650 | 60 |  |  |  |  |
|  | Block copolymer P | P1 | RP 6935 | 40 |  |  | 5 | 5 |
|  | Comparison block copolymer P' | P'1 | RP 6936 |  | 40 |  |  |  |
|  | Softener B | B1 | Kaydol | 180 | 180 | 180 | 180 | 180 |
|  | Comparison softener B' | B'1 | Markhor N 172 |  |  |  |  |  |
|  | Propylene polymer C | C1 | PM 600A | 20 | 20 | 20 | 20 | 20 |
|  | Comparison olefin polymer C' | C'1 | Nipolon Hard 1000 |  |  |  |  |  |
|  | Aromtic polymer D | D1 | Kristalex 5140 | 20 | 20 | 20 | 20 | 20 |
|  |  | D2 | Kristalex 3100 |  |  |  |  |  |
|  |  | D3 | Kristalex 3070 |  |  |  |  |  |
|  | Filler E | E1 | TALCAN HAYASHI |  |  |  |  |  |
|  |  | E2 | SUPER 3S |  |  |  |  |  |
|  |  | E3 | TOKUSIL UR |  |  |  |  |  |
| Evaluation | A-hardness |  |  | 33 | 34 | 34 | 37 | 35 |
|  | Heat resistance (Sterilization test by heating) |  |  | X | X | ○ | ○ | ○ |
|  | Anti-leakage test 11 *1 |  | ○ | 20 | 20 | 20 | 20 | 20 |
|  | (Plastic needle inserting test) |  | Δ | 0 | 0 | 0 | 0 | 0 |
|  |  |  | X | 0 | 0 | 0 | 0 | 0 |
|  | Anti-leakage test 12 *1 |  | ○ | 20 | 20 | 20 | 20 | 20 |
|  | (Mixing injection assuming test) |  | Δ | 0 | 0 | 0 | 0 | 0 |
|  |  |  | X | 0 | 0 | 0 | 0 | 0 |
|  | Needle retaining test 10 *2 |  | 500 g | 3600 or more | 1960 | 24 | 50 | 55 |
|  | (Weight hanging test) |  | 600 g | 80 | 40 | 5 | 15 | 18 |

|  |  |  |  | COMPAR-ISON 6 | COMPAR-ISON 7 | COMPAR-ISON 8 | COMPAR-ISON 9 | COMPAR-ISON 10 |
|---|---|---|---|---|---|---|---|---|
| Material | Block copolymer A | A1 | G 1651 | 5 |  | 60 | 60 | 60 |
|  |  | A2 | G 1633 |  | 5 |  |  |  |
|  |  | A3 | SEPTON 4055 |  |  |  |  |  |
|  |  | A4 | SEPTON 2006 |  |  |  |  |  |
|  | Comparison block copolymer A' | A'1 | G 1650 |  |  |  |  |  |
|  | Block copolymer P | P1 | RP 6935 | 95 | 95 | 40 | 40 | 40 |
|  | Comparison block copolymer P' | P'1 | RP 6936 |  |  |  |  |  |
|  | Softener B | B1 | Kaydol | 180 | 180 |  | 330 | 260 |
|  | Comparison softener B' | B'1 | Markhor N 172 |  |  | 180 |  |  |
|  | Propylene polymer C | C1 | PM 600A | 20 | 20 | 20 | 20 | 80 |
|  | Comparison olefin polymer C' | C'1 | Nipolon Hard 1000 |  |  |  |  |  |
|  | Aromtic polymer D | D1 | Kristalex 5140 | 20 | 20 | 20 | 20 | 40 |
|  |  | D2 | Kristalex 3100 |  |  |  |  |  |
|  |  | D3 | Kristalex 3070 |  |  |  |  |  |
|  | Filler E | E1 | TALCAN HAYASHI |  |  |  |  |  |
|  |  | E2 | SUPER 3S |  |  |  |  |  |
|  |  | E3 | TOKUSIL UR |  |  |  |  |  |
| Evaluation | A-hardness |  |  | 36 | 37 | 37 | 22 | 58 |
|  | Heat resistance (Sterilization test by heating) |  |  | Δ | ○ | X | ○ | ○ |
|  | Anti-leakage test 11 *1 |  | ○ | 12 | 10 | 20 | 20 | 1 |
|  | (Plastic needle inserting test) |  | Δ | 6 | 5 | 0 | 0 | 2 |
|  |  |  | X | 2 | 5 | 0 | 0 | 17 |
|  | Anti-leakage test 12 *1 |  | ○ | 14 | 12 | 19 | 20 | 0 |
|  | (Mixing injection assuming test) |  | Δ | 3 | 4 | 1 | 0 | 2 |
|  |  |  | X | 3 | 4 | 0 | 0 | 18 |
|  | Needle retaining test 10 *2 |  | 500 g | 1900 | 1330 | 3600 or more | 135 | 3600 or more |
|  | (Weight hanging test) |  | 600 g | 267 | 150 | 890 | 12 | 2806 |

*1 The number of samples coming under each evaluation by the visual observation of ○, Δ, X in 20 samples.
*2 The span of time (seconds) until the needle coming out when two kinds of weights(500 g, 600 g) were loaded.

TABLE 5

| Material | | | | COMPARISON 11 | COMPARISON 12 | COMPARISON 13 | COMPARISON 14 |
|---|---|---|---|---|---|---|---|
| Material | Block copolymer A | A1 | G 1651 | 80 | 60 | | 60 |
| | | A2 | G 1633 | | | | |
| | | A3 | SEPTON 4055 | | | 60 | |
| | | A4 | SEPTON 2006 | | | | |
| | Comparison block copolymer A' | A'1 | G 1650 | | | | |
| | Block copolymer P | P1 | RP 6935 | 20 | 40 | 40 | 40 |
| | Comparison block copolymer P' | P'1 | RP 6936 | | | | |
| | Softener B | B1 | Kaydol | 180 | 180 | 180 | 180 |
| | Comparison softener B' | B'1 | Markhor N 172 | | | | |
| | Propylene polymer C | C1 | PM 600A | 20 | 20 | 20 | 20 |
| | Comparison olefin polymer C' | C'1 | Nipolon Hard 1000 | | | | |
| | Aromtic polymer D | D1 | Kristalex 5140 | | | | 100 |
| | | D2 | Kristalex 3100 | | | | |
| | | D3 | Kristalex 3070 | | | | |
| | Filler E | E1 | TALCAN HAYASHI | | | | |
| | | E2 | SUPER 3S | | | | |
| | | E3 | TOKUSIL UR | | | | |
| Evaluation | A-hardness | | | 33 | 34 | 35 | 47 |
| | Heat resistance (Sterilization test by heating) | | | ○ | ○ | ○ | X |
| | Anti-leakage test 11 *1 | | ○ | 20 | 20 | 20 | 10 |
| | (Plastic needle inserting test) | | Δ | 0 | 0 | 0 | 4 |
| | | | X | 0 | 0 | 0 | 6 |
| | Anti-leakage test 12 *1 | | ○ | 20 | 20 | 20 | 13 |
| | (Mixing injection assuming test) | | Δ | 0 | 0 | 0 | 3 |
| | | | X | 0 | 0 | 0 | 4 |
| | Needle retaining test 10 *2 | | 500 g | 225 | 191 | 254 | 3600 or more |
| | (Weight hanging test) | | 600 g | 23 | 33 | 37 | 3600 or more |

| | | | | COMPARISON 15 | COMPARISON 16 | COMPARISON 17 | COMPARISON 18 |
|---|---|---|---|---|---|---|---|
| Material | Block copolymer A | A1 | G 1651 | 60 | 60 | | 60 |
| | | A2 | G 1633 | | | | |
| | | A3 | SEPTON 4055 | | | 60 | |
| | | A4 | SEPTON 2006 | | | | |
| | Comparison block copolymer A' | A'1 | G 1650 | | | | |
| | Block copolymer P | P1 | RP 6935 | 40 | 40 | 40 | 40 |
| | Comparison block copolymer P' | P'1 | RP 6936 | | | | |
| | Softener B | B1 | Kaydol | 180 | 180 | | 70 |
| | Comparison softener B' | B'1 | Markhor N 172 | | | 180 | |
| | Propylene polymer C | C1 | PM 600A | | | 20 | 20 |
| | Comparison olefin polymer C' | C'1 | Nipolon Hard 1000 | | 20 | | |
| | Aromtic polymer D | D1 | Kristalex 5140 | 20 | 20 | 20 | 20 |
| | | D2 | Kristalex 3100 | | | | |
| | | D3 | Kristalex 3070 | | | | |
| | Filler E | E1 | TALCAN HAYASHI | | | | |
| | | E2 | SUPER 3S | | | 20 | |
| | | E3 | TOKUSIL UR | | | | |
| Evaluation | A-hardness | | | *3 | 32 | 35 | *3 |
| | Heat resistance (Sterilization test by heating) | | | | X | X | |
| | Anti-leakage test 11 *1 | | ○ | | 19 | 20 | |
| | (Plastic needle inserting test) | | Δ | | 1 | 0 | |
| | | | X | | 0 | 0 | |
| | Anti-leakage test 12 *1 | | ○ | | 19 | 18 | |
| | (Mixing injection assuming test) | | Δ | | 1 | 2 | |
| | | | X | | 0 | 0 | |
| | Needle retaining test 10 *2 | | 500 g | | 2909 | 3200 | |
| | (Weight hanging test) | | 600 g | | 112 | 158 | |

*1 The number of samples coming under each evaluation by the visual observation of ○, Δ, X in 20 samples.
*2 The span of time (seconds) until the needle coming out when two kinds of weights (500 g, 600 g) were loaded.
*3 Being unable to mold The molded article samples made of the composites of EXAMPLES 1 to 30 shown in Tables 1, 2, and 3 have each excellent heat resistance, anti-leakage, and needle retaining properties.

The molded article sample made of the composite of COMPARISON 1 relates to a composite in which a comparison block copolymer A'1, having a smaller Mw was used instead of said block copolymer A1, so that said sample had an inferior heat resistance.

The molded article sample made of the composite of COMPARISON 2 relates to a composite in which a comparison block copolymer P' having a smaller Mw was used instead of said block copolymer P, so that said sample had inferior heat resistance and needle retaining property.

The molded article sample made of the composite of COMPARISON 3 relates to a composite in which no block copolymer P was contained, so that said sample had a remarkably inferior needle retaining property.

The molded article samples made of the composites of COMPARISONS 4 and 5 relate to composites in which the ratio of said block copolymer A and said block copolymer P was outside of the range limited in Claims, so that said samples each had an inferior needle retaining property.

The molded article samples made of the composites of COMPARISONS 6 and 7 relate to composites in which the ratio of said block copolymer A and said block copolymer P was outside of the range limited in Claims, so that said samples each had an inferior anti-leakage property.

The molded article sample made of the composite of COMPARISON 8 relates to a composite in which a comparison softener B' having a lower kinematic viscosity at 40° C. was combined instead of said softener B, so that said sample had inferior heat resistance.

The molded article sample made of the composite of COMPARISON 9 relates to a composite in which said softener B was combined in an amount beyond the range limited in Claims, so that said sample has a remarkably inferior needle retaining property.

The molded article sample made of the composite of COMPARISON 10 relates to a composite in which said propylene polymer C was combined in an amount beyond the range limited in Claims, so that said sample had a remarkably inferior anti-leakage property.

The molded article samples made of the composites of COMPRISONS 11, 12 and 13 each relate to composites in which no aromatic polymer D was combined, so that said samples each had a remarkably inferior needle retaining property.

The molded article sample 14 made of the composite of COMPARISON 14 relates to a composite in which said aromatic polymer D was combined in an amount beyond the range limited in Claims, so that said sample had an inferior anti-leakage property.

The molded article sample 15 made of the composite of COMPARISON 15 relates to a composite in which no propylene polymer C was combined, so that said sample could not be molded into a plug shape.

The molded article sample made of the composite of COMPARISON 16 relates to a composite in which comparison olefin polymer C' was combined instead of said propylene polymer C, so that said sample had inferior heat resistance.

The molded article sample made of the composite of COMPARISON 17 relates to a composite in which comparison softener B' having a lower kinematic viscosity at 40° C. was combined instead of said softener B, so that said sample had inferior heat resistance.

The molded article sample made of the composite of COMPARISON 18 relates to a composite in which said softener B was combined in an amount below the range limited in Claims, so that said sample can not be molded into a plug shape.

POSSIBILITY OF INDUSTRIAL USE

Said composite of the present invention can be molded by known methods such as injection molding, extrusion molding, and press molding or the like. The resulting molded article using said composition of the present invention can be preferably used as the plug for a medical vessel, such as an infusion bag or the like, because said molded article has important properties required for the plug of a medical vessel, such as heat resistance, anti-leakage and needle retaining properties.

The invention claimed is:

1. An elastomer composite comprising:
   100 parts by mass of a block copolymer mixture containing 10 to 90 parts by mass of a block copolymer A, and 90 to 10 parts by mass of a block copolymer P, with the total amount of said block copolymer A and said block copolymer P being 100 parts by mass;
   100 to 300 parts by mass of a softener B, having a kinetic viscosity in the range of between 50 and 500 centistokes (cSt) at 40° C.;
   1 to 50 parts by mass of a propylene polymer C, having a modulus in bending in the range of between 1000 and 3000 MPa;
   and 1 to 50 parts by mass of an aromatic polymer D;
   wherein said block copolymer A is a block copolymer which is a hydrogenated compound of a block copolymer Z1, having one polymer block Y1, being mainly composed of a conjugated diene monomer, and two polymer blocks X1, being mainly composed of an aromatic vinyl monomer, each one at each end of said polymer block Y1, said block copolymer A having a weight average molecular weight in the range of between 150,000 and 500,000, and containing 20 to 50% by mass of an aromatic vinyl monomer unit, and said block copolymer P is a block copolymer which is a hydrogenated compound of a block copolymer Z2, having one copolymer block Y2, being mainly composed of a conjugated diene monomer and an aromatic vinyl monomer, and two polymer blocks X2, being mainly composed of an aromatic vinyl monomer, each one at each end of said copolymer block Y2, said block copolymer P having a weight average molecular weight in the range of between 160,000 and 400,000, and containing 40 to 80% by mass of an aromatic vinyl monomer unit.

2. An elastomer composite in accordance with claim 1, wherein said block copolymer P is a multiblock copolymer.

3. An elastomer composite in accordance with claim 1, wherein said block copolymer P is a distribution controlled block copolymer.

4. An elastomer composite in accordance with claim 1, wherein said conjugated diene monomer composing said block copolymer A and said block copolymer P is butadiene and/or isoprene.

5. An elastomer composite in accordance with claim 1, wherein said propylene polymer C is polypropylene.

6. An elastomer composite in accordance with claim 1, wherein the softening point of said aromatic polymer D is in the range of between 80 and 200° C., said softening point being measured by the method according to ASTM E28.

7. An elastomer composite in accordance with claim 1, wherein said aromatic polymer D contains a polymer or a copolymer the main component of which is α-methylstyrene.

8. An elastomer composite, wherein 1 to 100 parts by mass of a filler E is further added to said elastomer composite, in accordance with claim 1.

9. An elastomer composite in accordance with claim 8, wherein said tiller E is plate-like or scaly.

10. An elastomer composite in accordance with claim 9, wherein said plate-like or scaly filler E is talc, clay, mica or sericite.

11. An elastomer composite in accordance with any of claim 1, wherein A hardness of said elastomer composite is in the range of between 30 and 50, said A hardness being measured by the method according to JIS K6253, with a measuring time of 1 second.

12. A plug of a medical vessel consisting of said elastomer composite in accordance with claim 1.

13. An elastomer composite in accordance with claim 2, wherein said conjugated diene monomer composing said block copolymer A and said block copolymer P is butadiene and/or isoprene.

14. An elastomer composite in accordance with claim 3, wherein said conjugated diene monomer composing said block copolymer A and said block copolymer P is butadiene and/or isoprene.

15. An elastomer composite in accordance with claim 2, wherein said propylene polymer C is polypropylene.

16. An elastomer composite in accordance with claim 3, wherein said propylene polymer C is polypropylene.

17. An elastomer composite in accordance with claim 4, wherein said propylene polymer C is polypropylene.

18. An elastomer composite in accordance with claim 2, wherein the softening point of said aromatic polymer D is in the range of between 80 and 200° C., said softening point being measured by the method according to ASTM E28.

19. An elastomer composite in accordance with claim 3, wherein the softening point of said aromatic polymer D is in the range of between 80 and 200° C., said softening point being measured by the method according to ASTM E28.

20. An elastomer composite in accordance with claim 4, wherein the softening point of said aromatic polymer D is in the range of between 80 and 200° C., said softening point being measured by the method according to ASTM E28.

* * * * *